United States Patent
Vinciarelli (10) Patent No.: US 11,757,353 B1
(45) Date of Patent: Sep. 12, 2023

(54) START-UP CONTROL IN POWER SYSTEMS USING FIXED-RATIO CONVERSION

(71) Applicant: Vicor Corporation, Andover, MA (US)

(72) Inventor: Patrizio Vinciarelli, Boston, MA (US)

(73) Assignee: VICOR CORPORATION, Andover, MA (US)

( * ) Notice: Subject to any disclaimer, the term of this patent is extended or adjusted under 35 U.S.C. 154(b) by 0 days.

(21) Appl. No.: 17/170,406

(22) Filed: Feb. 8, 2021

Related U.S. Application Data (63) Continuation of application No. 16/849,372, filed on Apr. 15, 2020, now Pat. No. 10,951,113, which is a continuation of application No. 16/581,580, filed on Sep. 24, 2019, now Pat. No. 10,658,923, which is a continuation of application No. 16/235,952, filed on Dec. 28, 2018, now Pat. No. 10,454,361, which is a continuation of application No. 15/976,773, filed on May 10, 2018, now Pat. No. 10,205,381.

(51) Int. Cl.
  *H02M 1/36* (2007.01)
  *H02M 1/08* (2006.01)
  *H02M 3/158* (2006.01)

(52) U.S. Cl.
  CPC ............. *H02M 1/36* (2013.01); *H02M 1/083* (2013.01); *H02M 3/158* (2013.01)

(58) Field of Classification Search
  CPC .. Y02B 70/1441; H02M 1/36; H02M 1/4241; H02J 1/102; H02J 50/12; H02J 7/025; H02J 17/00; H02J 7/14
  USPC .................................................. 327/538, 540
  See application file for complete search history.

(56) References Cited

U.S. PATENT DOCUMENTS

| | | | |
|---|---|---|---|
| 6,078,510 A * | 6/2000 | Spampinato | H02M 3/33523 363/21.16 |
| 6,330,169 B2 | 12/2001 | Mullett et al. | |
| 6,930,893 B2 | 8/2005 | Vinciarelli | |
| 6,934,166 B2 | 8/2005 | Vinciarelli | |
| 7,145,786 B2 | 12/2006 | Vinciarelli | |
| 7,170,764 B2 | 1/2007 | Vinciarelli | |
| 7,212,419 B2 | 5/2007 | Vinciarelli | |
| 7,420,825 B2 | 9/2008 | Vinciarelli | |
| 7,423,892 B2 | 9/2008 | Vinciarelli | |
| 7,673,157 B2 * | 3/2010 | Chapuis | G06F 1/3253 713/320 |
| 7,782,639 B2 | 8/2010 | Vinciarelli | |

(Continued)

OTHER PUBLICATIONS

"LTC7820: Fixed Ratio High Power Inductorless (Charge Pump) DC/DC Controller," Analog Devices, 28 pages (2017).

(Continued)

*Primary Examiner* — Adam D Houston
(74) *Attorney, Agent, or Firm* — Foley & Lardner LLP (57) ABSTRACT

A power converter system converts power from an input source for delivery to an active load. An input current surge at startup may be reduced by combining power converter switch resistance modulation with active load control. In another aspect, an input current surge at startup in an array of power converters may be reduced by periodically reconfiguring the array during the startup phase to accumulatively increase the output voltage up to a predetermined output voltage. A power converter may include a controller that provides an over-current signal to the load to reduce the load or advise of potential voltage perturbations.

21 Claims, 5 Drawing Sheets

(56) References Cited

U.S. PATENT DOCUMENTS

| | | | |
|---|---|---|---|
| 7,834,613 B2 * | 11/2010 | Ziegler | G01R 15/185 |
| | | | 324/117 R |
| 8,203,372 B2 | 6/2012 | Arduini | |
| 8,487,477 B2 * | 7/2013 | Heineman | H02J 1/102 |
| | | | 307/53 |
| 8,711,580 B2 * | 4/2014 | Zhang | H02M 1/32 |
| | | | 363/133 |
| 8,792,257 B2 * | 7/2014 | Berghegger | H02M 3/33507 |
| | | | 363/21.15 |
| 9,287,795 B2 * | 3/2016 | Ma | H02M 3/3388 |
| 9,325,247 B1 | 4/2016 | Vinciarelli | |
| 9,337,743 B2 * | 5/2016 | Dai | H02M 3/3353 |
| 9,350,260 B2 * | 5/2016 | Dai | H02M 1/36 |
| 9,425,700 B2 * | 8/2016 | Lu | H03M 3/3376 |
| 9,490,709 B2 | 11/2016 | Lee et al. | |
| 9,537,422 B2 * | 1/2017 | Kawato | G05F 1/70 |
| 9,866,132 B2 * | 1/2018 | Ishigaki | H02J 7/342 |
| 9,929,595 B2 * | 3/2018 | Mao | H02J 50/10 |
| 10,020,746 B2 * | 7/2018 | Horii | H02M 1/32 |
| 10,050,515 B1 | 8/2018 | Chakraborty et al. | |
| 10,068,721 B2 * | 9/2018 | Grant | G06F 1/26 |
| 10,110,138 B1 * | 10/2018 | Murthy-Bellur | H02M 1/36 |
| 10,205,381 B1 * | 2/2019 | Vinciarelli | H02M 3/158 |
| 11,101,695 B2 * | 8/2021 | Yeo | H02J 50/70 |
| 11,247,615 B2 * | 2/2022 | Prentice | H02S 30/20 |
| 11,327,126 B2 * | 5/2022 | Goergen | G01R 31/67 |
| 2002/0073347 A1 * | 6/2002 | Zafarana | G06F 1/26 |
| | | | 713/300 |
| 2003/0142513 A1 * | 7/2003 | Vinciarelli | H02J 1/102 |
| | | | 363/17 |
| 2003/0227280 A1 * | 12/2003 | Vinciarelli | H02M 3/285 |
| | | | 323/265 |
| 2004/0184289 A1 * | 9/2004 | Vinciarelli | H02J 1/102 |
| | | | 363/15 |
| 2005/0185429 A1 * | 8/2005 | Vinciarelli | H02M 3/1584 |
| | | | 363/65 |
| 2007/0217235 A1 * | 9/2007 | Quazi | H05B 41/28 |
| | | | 363/89 |
| 2008/0018262 A1 * | 1/2008 | Green | H05B 41/2828 |
| | | | 315/225 |
| 2008/0031021 A1 * | 2/2008 | Ros | H02M 1/4258 |
| | | | 363/46 |
| 2008/0116695 A1 * | 5/2008 | Peterson | B60L 50/61 |
| | | | 290/40 C |
| 2008/0123374 A1 * | 5/2008 | Vinciarelli | H02M 7/10 |
| | | | 363/65 |
| 2008/0136343 A1 * | 6/2008 | Yu | H05B 41/2827 |
| | | | 315/219 |
| 2011/0215641 A1 * | 9/2011 | Peterson | H02J 4/00 |
| | | | 307/23 |
| 2011/0305047 A1 * | 12/2011 | Jungreis | H02M 1/08 |
| | | | 363/21.02 |
| 2012/0050053 A1 * | 3/2012 | Kim | H02P 9/102 |
| | | | 713/320 |
| 2012/0205973 A1 * | 8/2012 | McCaslin | H02J 3/381 |
| | | | 307/18 |
| 2012/0281444 A1 * | 11/2012 | Dent | H02J 3/38 |
| | | | 363/131 |
| 2013/0010517 A1 * | 1/2013 | Chu | G11C 7/109 |
| | | | 365/63 |
| 2013/0039104 A1 * | 2/2013 | Sharma | H02M 1/10 |
| | | | 363/123 |
| 2013/0050887 A1 * | 2/2013 | Fan | H01L 27/0262 |
| | | | 361/57 |
| 2014/0063875 A1 * | 3/2014 | Al-Shyoukh | H02M 1/36 |
| | | | 363/49 |
| 2014/0225439 A1 * | 8/2014 | Mao | H02J 50/12 |
| | | | 307/31 |
| 2014/0233283 A1 * | 8/2014 | Al-Shyoukh | H02M 1/36 |
| | | | 363/49 |
| 2014/0363169 A1 * | 12/2014 | Conger | H04B 10/693 |
| | | | 398/115 |
| 2015/0194811 A1 * | 7/2015 | Mao | H02M 3/33523 |
| | | | 307/104 |
| 2015/0365003 A1 * | 12/2015 | Sadwick | H02M 3/28 |
| | | | 363/21.01 |
| 2016/0190816 A1 * | 6/2016 | Rehm | H02J 50/12 |
| | | | 307/104 |
| 2016/0322906 A1 * | 11/2016 | Hwang | H02M 1/4208 |
| 2016/0322968 A1 * | 11/2016 | Mao | H03F 1/0222 |
| 2016/0380437 A1 * | 12/2016 | Casimir | H02J 7/1415 |
| | | | 307/9.1 |
| 2017/0077704 A1 * | 3/2017 | Faley | H02J 5/00 |
| 2017/0201181 A1 * | 7/2017 | Yabuzaki | H02M 1/12 |
| 2017/0358441 A1 * | 12/2017 | Nanchung | H05B 41/3927 |
| 2017/0358978 A1 * | 12/2017 | Vinciarelli | H02M 3/00 |
| 2017/0366093 A1 * | 12/2017 | Wambsganss | H02M 3/33546 |
| 2018/0054118 A1 * | 2/2018 | Lee | H02M 3/157 |
| 2018/0233206 A1 * | 8/2018 | Yu | G11C 16/0483 |
| 2019/0058393 A1 | 2/2019 | Elferich et al. | |
| 2019/0089197 A1 * | 3/2019 | Mao | H01F 27/363 |
| 2019/0097447 A1 * | 3/2019 | Partovi | H02J 50/12 |
| 2020/0244220 A1 * | 7/2020 | Van Der Zee | H03B 5/364 |

OTHER PUBLICATIONS

"LTC7821: Hybrid Step-Down Synchronous Controller," Analog Devices, 34 pages (2017).

Williams, J. et al., "Some Thoughts on DC/DC Converters," Linear Technology, Application Note 29, 46 pages (Oct. 1988).

Vicor, "BCM Bus Converter BCM6123xD1E13A3yzz (Previous parts BCM384x120y1K5ACzBCM384x120y1K5AC1) Isolated Fixed-Ratio DC-DC Converter," Rev 1.0 Mar. 2017, 29 pages.

Vicor, "BCM Bus Converter BCM6123xD1E2662yzz Fixed Ratio DC-DC Converter," Rev 1.0 Jul. 2016, 27 pages.

Vicor, "BCM Bus Converter BCM6123xD1E2663yzz Isolated Fixed Ratio DC-DC Converter," Rev 1.0 Feb. 2017, 28 pages.

\* cited by examiner

FIG. 6

START-UP CONTROL IN POWER SYSTEMS USING FIXED-RATIO CONVERSION

CROSS-REFERENCE TO RELATED PATENT APPLICATIONS

This application is a continuation of U.S. patent application Ser. No. 16/849,372, filed Apr. 15, 2020, which is a continuation of U.S. patent application Ser. No. 16/581,580, filed Sep. 24, 2019, now U.S. Pat. No. 10,658,923, which is a continuation of U.S. patent application Ser. No. 16/235,952, filed Dec. 28, 2018, now U.S. Pat. No. 10,454,361, which is a continuation of U.S. patent application Ser. No. 15/976,773, filed May 10, 2018, now U.S. Pat. No. 10,205,381, the entire contents of each of which are incorporated herein by reference.

TECHNICAL FIELD

This invention generally relates to controlling the rate at which energy is transferred from an electrical source to a load during system start-up, and more particularly, to control of fixed-ratio power converters and loads.

BACKGROUND

Distributing power in electronic systems may include using fixed-ratio converters, also known as bus converters, to convert a distributed bus voltage to lower or higher voltage required by a specific load. Typical bus converters may include isolated or non-isolated switching power converters which convert power via an inductive component, a transformer, or switched capacitor networks. Frequently, one or more regulators may be connected to receive power form the bus converter output to regulate the power or voltage delivered to respective loads. The loads may include a variety of "active" loads which may present time varying current demands on the power system. For example, typical microprocessors as loads present significant time varying changes in the load current demanded from the power system. Other electronic circuitry including communications circuitry, storage devices, lighting systems, including LED arrays, etc. may similarly present time varying current demands on the power system. Such power systems may typically include energy storage, such as back-up batteries and hold-up capacitance, and filtering elements, such as filter capacitances, distributed throughout the system, which may be connected directly to the output of the bus converters or further downstream, e.g. at the output of intervening converters, such as voltage regulators, and directly across the loads. Current surges on system start-up or re-introduction of power may challenge many elements of the system including, power switching elements in the bus converters.

SUMMARY

One exemplary embodiment includes an apparatus for delivering power from an input source at a source voltage, $V_S$, to a load at a load voltage, $V_L$. A bus converter may have a plurality of power switching elements and a switch controller to operate the power switching elements in a series of converter operating cycles during start-up and steady-state phases of operation to convert power received from the converter input at an input voltage, $V_{IN}$, and input current, $I_{IN}$, for delivery to the converter output at an output voltage, $V_{OUT}$, and an output current, $I_{OUT}$, using a transformation ratio, K, where $K=V_{OUT}/V_{IN}$, that is essentially constant. The bus converter may turn the power switching elements ON in a high resistance state in the start-up phase to increase the equivalent series resistance and in a low resistance state in the steady-state phase to decrease the equivalent series resistance. A control circuit may provide a control signal to disable the load during the start-up phase and enable the load during the steady-state phase.

Another exemplary embodiment includes an apparatus for delivering power from an input source at a source voltage, $V_S$, to a load at a load voltage, $V_L$. A bus converter may have a plurality of power switching elements and a switch controller to operate the power switching elements in a series of converter operating cycles during which power received from the converter input at an input voltage, $V_{IN}$, and input current, $I_{IN}$, is converted for delivery to the converter output at an output voltage, $V_{OUT}$, and an output current, $I_{OUT}$, via the power switching elements during a start-up phase of operation and during a steady-state phase of operation. The bus converter may convert power using a transformation ratio, K, where $K=V_{OUT}/V_{IN}$, that is essentially constant in the steady-state phase of operation. The bus converter may limit the current flowing through the power switching elements to a predetermined in-rush limit in the start-up phase of operation. The in-rush limit may be less than the level of current permitted during the steady-state phase. A control circuit may provide a control signal to disable the load during the start-up phase of operation and enable the load during the steady-state phase of operation.

Various illustrative implementations of the above embodiments may include one or more of the following features, alone or in combination with one another. The bus converter may operate in the start-up phase when the output voltage is below a first threshold and in the steady-state phase when the output voltage is above a second threshold. The bus converter may operate in the start-up phase after the switch controller receives power and a converter enable signal. The switch controller may adjust a drive level for the power switching elements within a range during the start-up phase from an initial value for turning the one or more of the power switching elements ON with a highest switch resistance to a final value for turning the one or more of the power switching elements ON with a lowest switch resistance. The switch controller may adjust the drive level during the start-up phase as a function of one or more of the following: input current, output current, switch current, or a voltage across a resonant capacitor. The bus converter may transition to the steady-state phase after the drive level of the one or more power switching elements reaches the final value. The bus converter may include the control circuit and the switch controller may send a signal to the control circuit after the final value is reached. The switch controller may monitor a voltage across a resonant capacitor (e.g., may include an input connected to monitor the voltage) and provide a signal (e.g., via an output) indicating that a current drawn from the converter output meets or exceeds predetermined criteria during steady-state operation. The predetermined criteria may include any one or more of the following: a predetermined change in the current, a predetermined rate of change in the current, or a predetermined threshold level of the current.

The apparatus may include one or more energy storage devices and/or loads connected to the bus converter output. In some embodiments, the apparatus may include one or more regulators, each having a regulator input connected to receive power from the bus converter output, a regulator output, and regulation circuitry adapted to convert power received from the regulator input for controlled delivery to the load via the regulator output. In some embodiments, the regulators may each further include a control input connected to receive the control signal and is adapted to restrict power delivery to the regulator output during the start-up phase. Some of the loads may include a regulator which restricts power delivery to the regulator output during the start-up phase in response to the control signal. The regulators may be switching voltage regulators. A system circuit board may include the loads, the regulators, and a power bus connecting the bus converter output to the energy storage devices, the regulators, and other loads. One or more of the loads may include electronic circuitry, such as integrated circuits. Some electronic circuitry loads may receive power from a respective regulator. Either the regulator or the electronic circuitry of the load may in response to the control signal restrict the power it draws during the start-up phase. The regulators may be switching voltage regulators. The bus converter and one or more regulators may be assembled to a system circuit board with the regulators disposed at a distance from the bus converter. In some embodiments, one or more of the regulators may be mounted to the system circuit board.

The bus converter may include an inductive component and may use a current flowing in an inductive component to charge and discharge capacitances in the bus converter to reduce a voltage across one or more one of the power switching elements prior to turning it ON. The bus converter may be packaged together with the control circuit as a self-contained assembly for installation as a unit. The bus converter may include a transformer driven by the primary power switching elements and output circuitry receiving power from the transformer. A resonant circuit may be formed including the transformer and having a characteristic resonant frequency and period with the primary power switching elements connected to drive the resonant circuit and a switch controller operating the primary power switching elements in a series of converter operating cycles, each characterized by two power transfer intervals of essentially equal duration less than the characteristics resonant period and during which one or more of the primary power switching elements is ON and power is transferred from the input to the output via the transformer. The bus converter output may be galvanically isolated from or connected to the bus converter input. The input circuitry may include a winding having a first number of turns and the output circuitry may include a winding having a second number of turns, with the bus converter transformation ratio being a function of the ratio of the first number of turns to the second number of turns. The input circuitry and at least a portion of the output circuitry may be connected (e.g., galvanically connected) in series across the source for at least a portion of the converter operating cycle, such that an absolute value of the input voltage, $V_{IN}$, applied to the input circuit is approximately equal to the absolute value of the DC source voltage $V_S$ minus a number, N, times the absolute value of the output voltage, $V_{OUT}$, where N is at least 1. The bus converter may include an inductive component and use a current flowing in the inductive component to charge and discharge capacitances in the bus converter, where a current through the power switching elements is reduced prior to turning ON or OFF. The voltage across the power switching elements may be reduced to essentially zero volts prior to turn ON. The bus converter transformation ratio may be greater than 1 for step-up or less than 1 for step down. The bus converter comprises a switched capacitor converter.

The control circuit may sense the output voltage, $V_{OUT}$, (e.g., through an input) and disable the load using the control signal when the control circuit determines the output voltage is below a predetermined threshold. The predetermined threshold may be a function of the input voltage, $V_{IN}$. The determining may be a function of the input voltage, $V_{IN}$, or output voltage, $V_{OUT}$, adjusted by the transformation ratio K. The determining may be a function of the difference between the input voltage, $V_{IN}$, and output voltage, $V_{OUT}$, one of which is adjusted by the transformation ratio K. The control circuit may include an input for determining the input or output current and disable the load using the control signal when the control circuit determines the input or output current meets predetermined criteria. The switch controller may include a switch drive controller which senses an indication of the input current, operates the power switching elements in a high-impedance mode during the start-up phase and in a low-impedance mode during the steady-state phase, and adjusts the switch drive to limit the input current. The switch drive controller may increase the switch drive level during the start-up phase to maintain the input current at a level approximately equal to the in-rush limit. The control circuit may send the enable signal after the switch drive reaches a predetermined level, which may be the switch drive level for operation of the switches in the steady-state phase. The bus converter may include the control circuit.

Another exemplary embodiment includes an apparatus for delivering power from an input source at a source voltage, $V_S$, to a load at a load voltage, $V_L$. A bus converter may have a converter input, a converter output, a plurality of power switching elements and a switch controller adapted to operate the power switching elements in a series of converter operating cycles to convert power received from the converter input at an input voltage, $V_{IN}$, for delivery to the converter output at an output voltage, $V_{OUT}$. A controller may monitor a voltage across a resonant capacitor and provide a signal indicating that the current drawn from the converter output meets or exceeds predetermined criteria.

Various illustrative implementations of the above embodiment may include one or more of the following features, alone or in combination with one another. The predetermined criteria may include a predetermined change in the current, a predetermined rate of change in the current, or a predetermined threshold level of the current. The one or more of the power switching elements may be turned ON in a low resistance state in the steady-state phase to control the equivalent series resistance of the bus converter. The controller may monitor the output current during the steady-state phase and provide the signal to the load. The bus converter may be operated in a start-up phase to turn one or more of the power switching elements ON in a high resistance state to increase the equivalent series resistance of the bus converter. The controller may provide a control signal to disable the load during the start-up phase and to enabled the load during the steady-state phase. The bus converter may convert power using a transformation ratio, K, where $K=V_{OUT}/V_{IN}$, that is essentially constant during the steady-state phase. The bus converter may convert power via a transformer. The bus converter may convert power via switched capacitors.

DETAILED DESCRIPTION

Figure 1:
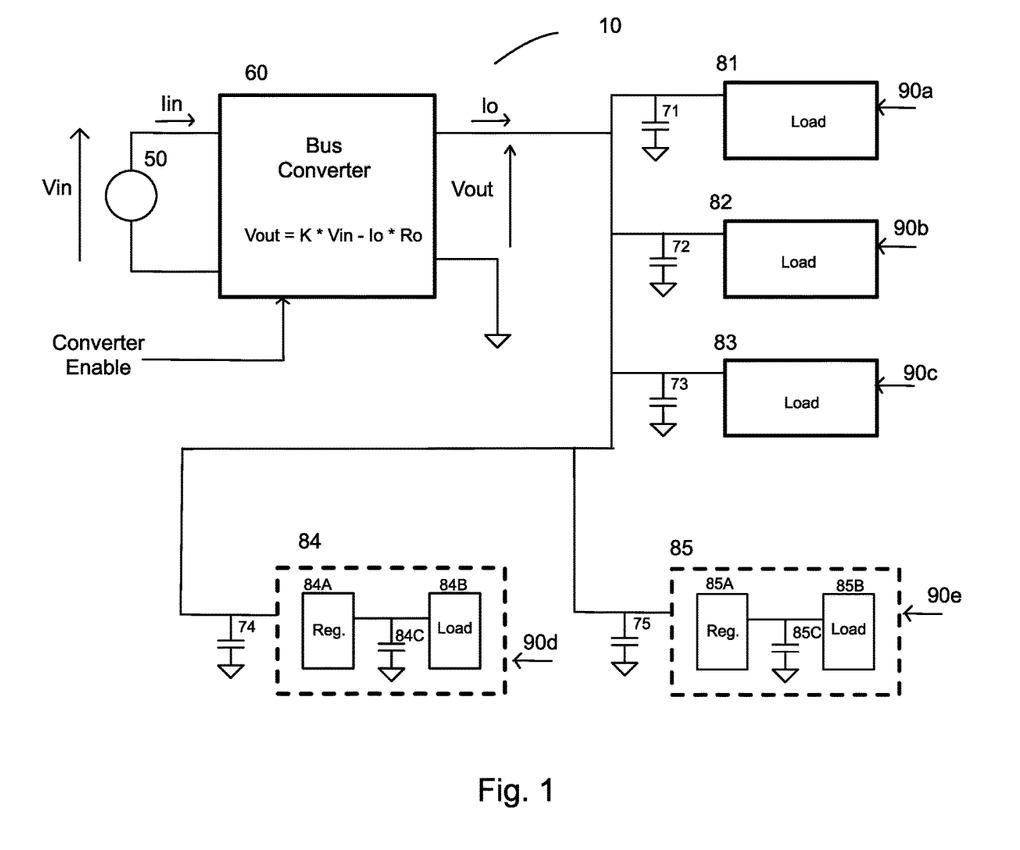
FIG. 1 shows a block diagram of a power conversion system according to the invention including a fixed-ratio converter and a plurality of individual load elements.

Referring to the example of FIG. 1, a power system 10 as shown includes a fixed-ratio converter, also known as a bus converter, 60, connected to supply power to a plurality of loads, e.g. loads 81, 82, 83, 84, and 85. Loads 84 and 85 as shown each include a regulator 84A, 85A, connected to receive power from the bus converter 60 and regulate the power delivered to its respective load 84B, 85B, and a filter capacitance 84C, 85C connected to the output of its respective regulator. Regulators 84A and 85A may preferably use a non-isolated switching voltage regulation, e.g. a buck, boost, or buck-boost, power conversion topology, or other suitable circuitry, such as battery charge controller, or backlight controller, etc. The regulators 84A and 85A may, in some embodiments, each include a regulator input connected to receive power from an output of the bus converter 60, a regulator output, and regulation circuitry adapted to convert power received from the regulator input for controlled delivery to the loads 84B and 85B. The power system 10 may include an electrical power source 50 connected supply power to the bus converter 60 and capacitive energy storage and filtering devices, such as capacitors 71, 72, 73, 74, 75, connected to the output of the bus converter 60 as shown in FIG. 1. As shown, the energy storage and filtering devices may be distributed throughout the power system 10, including within, and external to, the bus converter 60. The power source 50 may as shown in FIG. 1 be a DC source, such as a front end rectification and/or filtering circuit, a power factor correcting converter, a regulator, or other power source, such as a battery or a 48 VDC telecommunications supply.

The bus converter 60 may be generally characterized as operating with an essentially fixed conversion ratio, $K=V_{OUT}/V_{IN}$. The transformation ratio may be described as essentially fixed because the finite output resistance of the converter causes some droop as a function of output current. For example, the bus converter output voltage may be expressed in terms of the input voltage, transformation ratio, and the output current: $V_{OUT}=K*V_{IN}-I_{OUT}*Rout$ as discussed below in connection with FIG. 3. The output voltage, $V_{OUT}$, may be set to any level desired using different conversion ratios, for example, assuming the source 50 supplies 48 VDC, typical bus converter transformation ratios such as K=1/4 may be used to supply 12 VDC, K=1/5 to supply 9.6 VDC, etc., as required by the loads. Multiple bus converters having different transformation ratios may be connected to the source 50 to provide multiple output voltages as needed. Although many telecom and computing systems use bus converters having transformation ratios that are less than 1 (K=1/4 down conversion) to supply most loads, the emergence of ASICs and processor cards or packages requiring higher voltages, e.g. 48V, may create the need for bus converters having transformation ratios greater than 1 (K=4 up conversion) in systems using lower bus voltages, e.g. 12V legacy systems.

Each load 81, 82, 83, 84, 85 shown in FIG. 1 may represent an aggregated load consisting of a plurality of individual loads, and the loads may be distributed throughout the system such as on a system printed circuit board. The loads, e.g. loads 81, 82, 83, 84B, 85B may include: microprocessors, semiconductor memory, information storage devices such as electro-mechanical or solid state disk drives, lighting such as LED backlights or displays, either of which may include a controller, communication devices, e.g. as shown for the example of loads 84 and 85. In various embodiments, the loads 81, 82, 83, 84B, 85B include integrated circuits Each load or load group may further include one or more power regulators to regulate power received from the power converter 60. Even a single load may present widely varying current demands from the power system 10, a microprocessor transitioning through various computational states. Naturally, the aggregate of the loads connected to the output of bus converter 60 under normal operating conditions may present even greater variations in the time-varying load current, IL, drawn from the converter 60, under essentially constant output voltage, $V_{OUT}$, conditions. In some embodiments, the system printed circuit board may include the loads 81, 82, 83, 84B, 85B, the regulators 84A and 85A, the energy storage devices (e.g., capacitors 71, 72, 73, 74, 75), the bus converter 60, and/or a power bus adapted to connected the output of the bus converter 60 to the energy storage devices and the regulators 84A and 85A. In some embodiments, any or all of the components, such as the regulators 84A and 85A, can be mounted to the system circuit board. In some embodiments, various of the components (e.g., the bus converter 60 and control circuitry) may be packaged together as a self-contained assembly, such as an assembly adapted to be installed as a unit.

Figure 3:
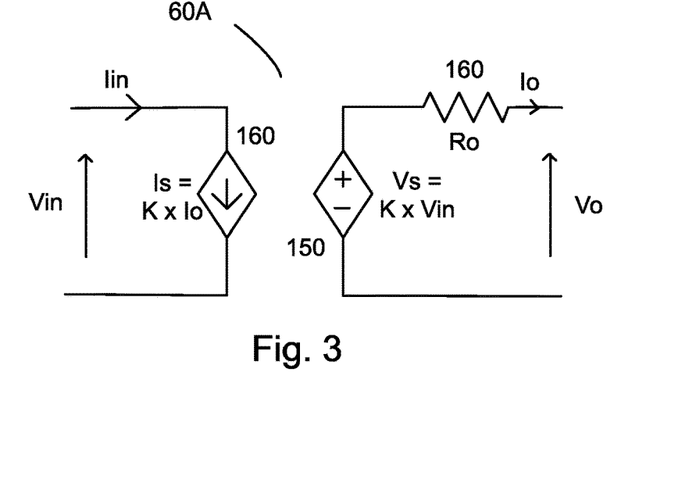
FIG. 3 shows a large signal model of the bus converter.

Referring to FIG. 3, a low frequency model 60A of the bus converter is shown including a controlled voltage source 150; an output resistance 160 having a resistance, $R_O$; and an input current sink 160. Resistance 160 in the simplified model 60A of FIG. 3 represents the equivalent output resistance of the bus converter. In an ideal DC transformer, the output resistance, $R_O$, may be zero. The controlled voltage source 150 produces a voltage, $V_S$, which is a function of the transformation ratio, K, and the input voltage, $V_{IN}$, to the converter. Similarly, the controlled current sink 160, sinks a current, Is, which is a function of the transformation ratio, K, and the output current, $I_O$ or $I_{OUT}$, drawn from the converter. The transformation ratio, K, of the converter depends upon the converter topology and configuration, e.g. transformer turns ratio (e.g., a ratio of a first number of turns of a winding of input circuitry to a second number of turns of a winding of output circuitry), full or half bridge drive or rectification circuitry, number of cells, series connection of input and output, etc.

The magnitude of $V_S$ may deviate from the ideal value as a function of load, temperature, and other factors in practical converter implementations. Similarly, the input current, $I_{IN}$, may include non-linear components and load independent currents, e.g. the quiescent current that a converter may draw from the source to power control circuitry, and other loss elements as a function of the operating point of the converter, causing $I_{IN}$ to depart from the ideal value, Is. The output resistance, $R_O$, may also vary as a function of the operating point of the converter, including its temperature, etc. However, the model shown in FIG. 3, generally provides a good first order approximation. In practical applications, it is generally desirable to minimize the magnitude of output resistance, $R_O$, of the bus converter to limit power dissipation in the converter and maintain the output voltage with load changes, i.e. reduce the effects of $R_O$. However, because the output voltage, $V_O$, output current, $I_O$, and thus input current, $I_{IN}$, are affected by the magnitude of output resistance, $R_O$, provision of a finite value of output resistance, $R_O$, may be beneficial to equalize load sharing among an array of power supplies connected in parallel ("droop compensation").

In a practical switching converters, i.e., switches used in the converter have parasitic capacitances and inductances, power may be dissipated in a switch when the switch is being turned ON, which is called "switching loss." Capacitances, both parasitic and lumped, across a switch if not discharged before the switch is turned ON may be a major contributor to switching loss. One way to reduce switching loss in a switching power converter (e.g., a buck, a boost, a buck-boost, or a fixed ratio switching power converter) uses an inductive component to fully or partially charge and discharge the capacitances associated with a switch before turning it ON to achieve full or partial zero voltage switching ("ZVS") during an energy recycling interval ("ERP") (which may also be called a "ZVS" interval). ZVS ideally causes the voltage across the switch to decline to zero volts, essentially eliminating switching losses associated with the capacitive discharge of the switch; however, any significant reduction, e.g. by 50 percent, 80 percent, 90 percent or more from the peak voltage across the switch, respectively reduces the switching losses during turn ON by 75 percent, 96 percent, 99 percent, or more. However, it may be difficult to control switches to turn ON or OFF at times when the voltage across the switch is at zero volts or a minimum voltage due to a variety of factors, including fast voltage or current transitions, very small signals, propagation delays, and noise in the converter. Turning switches ON and OFF at times when zero or minimal current is flowing through the switch, called zero current switching ("ZCS"), can also reduce losses and reduce noise. However, ZCS operation of switches also may be difficult for the same reasons as with ZVS.

Besides difficulty in ZVS and ZCS operations, it may also be difficult to sense the output current for a converter without dissipating excessive power. Typically, a sense resistor is connected in series with the load at the output side of the converter and the voltage across the sense resistor is sensed to monitor the output current. A trade-off between the need for sufficient signal voltage across the resistor, e.g. relative to noise, and power dissipation in the resistor, may lead to significant power consumption in the resistor, impacting converter efficiency.

One DC Transformer topology, called a Sine Amplitude Converter ("SAC"), is described in Vinciarelli, *Factorized Power Architecture with Point of Load Sine Amplitude Converters*, U.S. Pat. No. 6,930,893 issued Aug. 16, 2005; and in Vinciarelli, *Point of Load Sine Amplitude Converters and Methods*, U.S. Pat. No. 7,145,786 issued on Dec. 5, 2006, each assigned to VLT, Inc. and incorporated herein by reference in their entirety (the "SAC Patents"). The SAC DC transformer topology generally provides for very low output resistance, a transformation ratio, K, which is essentially constant over a wide operating range, provides ZVS of all power switches, provides ZCS of the secondary switches and partial ZCS of the primary switches (limited by magnetizing current in the transformer), and non-dissipative means for sensing the output current. An non-isolated variant of the bus converter topology having series-connected input and output circuits is described in Vinciarelli et al., *Power Distribution Architecture With Series-Connected Bus Converter*, U.S. application Ser. No. 13/933,252, filed Jul. 2, 2013 assigned to VLT, Inc. and incorporated herein by reference in its entirety.

Absent implementation of in-rush current limiting, at start-up the bus converter will attempt to establish the output voltage, $V_O$, at its output which is connected to the load, loads 81 through 85 (FIG. 1) and the capacitances 71 through 75 (FIG. 1) within the bandwidth of the converter. In some bus converters, such as a SAC operating over 1 MHz, the output may attempt to slew in under a microsecond. Because of the very low output resistance, $R_O$, and the capacitances 71-75 (FIG. 1) connected to the output of the bus converter 60 will generally be discharged to a voltage, that is lower than the nominal output voltage, $V_O$ or $V_{OUT}$, (typically zero Volts on start-up); the converter output current, $I_O$ or $I_{OUT}$, (and consequently the input current, $I_{IN}$) at start-up may be very high. This current surge may be called "in-rush" current in fixed ratio converters. In many cases, the in-rush current required to charge the capacitances 71-75, may exceed the current carrying capacity and/or dissipation limits of the switching elements, e.g. MOSFETs, and other components, e.g. inductor windings, magnetically permeable cores, in the converter 60 and at the source 50 (e.g. sags, current limiting, tripping of circuit breakers and fuses), potentially and may negatively impact operation of other systems that are connected to the same input source 50. Some loads may draw larger than normal currents when operated at voltages below their normal operating voltage, which may further exacerbate the in-rush effect during startup.

Various approaches (not shown) to controlling the input current during startup may include using a fixed or current-dependent resistance device (such as Negative-Temperature-Coefficient (NTC) thermistor) or a switching regulator, e.g. a buck regulator, in series with the bus converter input, i.e. between the source 50 and the bus converter input, to slowly ramp the input voltage, however, the persistent presence of the series resistance of the above approaches can cause loss of efficiency during steady-state operation. As described below, increasing the bus converter output resistance during startup, e.g. as a function of input current, may effectively control in-rush current without incurring the persistent efficiency penalty of the above approaches. Modulating the equivalent output resistance of a power converter, for example a SAC, by varying the ON resistance of the primary switches in the converter, as a means, e.g. of "soft-starting" the converter, performing output current limiting or improving current sharing between converters in a power sharing array, is taught in Vinciarelli, *Output Resistance Modulation in Power Converters*, U.S. Pat. No. 6,934,166, issued on Aug. 23, 2005 (the "166 Patent"), assigned to VLT, Inc. and incorporated herein by reference in its entirety.

As shown in FIG. 1, the loads may preferably include a control input, e.g. control inputs, e.g. 90a, 90b, 90c, 90d, 90e for individual load elements 81, 82, 83, 84, and 85, which may be used to influence the amount of current drawn by each load during a start-up phase. For example, control inputs 90a through 90e may receive a respective enable/disable signal in response to which the respective load element or group functionally connects or disconnects from the output of power converter 60. Functional disconnection of the load may include a standby state or standby mode in which current draw from the power converter 60 is reduced or limited, preferably to a minimal level, such as 20 percent or less of the normal level. For example, the enable/disable control signal may cause a microprocessor, ASIC, memory, or other electronic load to enter or remain in an inactive state, e.g. a sleep mode, in which the current drawn from the power system may be reduced to a much lower or negligible level compared with during its respective normal operational state, e.g. by using a lower clock frequency or keeping non-critical operations or portions of the circuit powered off, or disabling read/write operations, etc. During system start-up, the disable signal may be used to delay an initialization process until the enable signal is present. In other types of circuits, the enable/disable signal may disable transmitter circuitry, displays drivers, lighting controllers, disk drive motors and circuitry and so on. The aggregate load or each individual load element may be considered disabled when the current drawn is limited to 20 percent or less of its steady state level or of its peak level during normal operation.

Figure 2A:
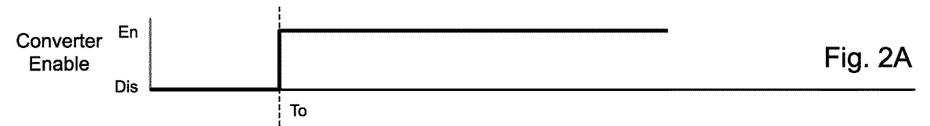
FIGS. 2A through 2F show waveforms of a power conversion system during a startup phase and during steady-state operation.

Referring to FIGS. 2A through 2F, waveforms for an in-rush limited bus converter 60 used with start-up control in power system 10 include: a converter enable signal (FIG. 2A); converter input current, $I_{IN}$, (FIG. 2B); converter output voltage, $V_{OUT}$, (FIG. 2C); a load enable signal (FIG. 2D); load current (shown scaled to the input side using the transformation ratio, $I_{LOAD} \times K$) (FIG. 2E); and a switch drive level (FIG. 2F) during the startup phase, i.e. from time $T_0$ to time $T_{SS}$, and the subsequent normal or steady-state operation, i.e. after time $T_{SS}$. The startup phase may be defined as beginning when two conditions are met (at time $T_0$ in FIGS. 2A-2F: (1) the bus converter 60 receives power from the source and (2) the power converter 60 is enabled to process power from its input for delivery to its output, e.g. using a converter enable signal such as shown in FIG. 2A. At time $T_0$, the bus converter 60 receiving the Converter Enable signal (FIG. 2A; 204, FIG. 4) begins converting power from its input to its output in a start-up phase that includes in-rush current limiting. It is assumed that power from the source 50 is available at the input of the converter 60 before the Converter Enable signal is asserted at time, $T_0$. Referring to the waveforms for input current (FIG. 2B) and output voltage (FIG. 2C), the bus converter 60 may operate the power switches of the converter to limit the input and output current, forcing the output voltage, $V_{OUT}$, to increase gradually from zero until reaching the steady-state operating value, $V_O \approx K^* V_{IN}$, at time $T_S$. As discussed in more detail below in connection with FIGS. 4 and 5, selected power switches in the converter may be operated in a high-impedance state during start-up to increase the output resistance $R_O$ during start-up.

Figure 2B:
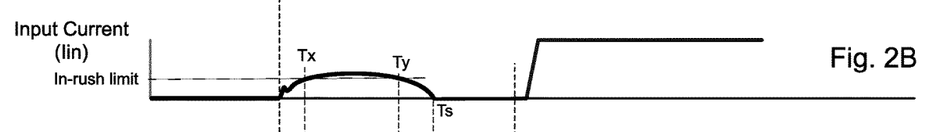
Figure 2C:
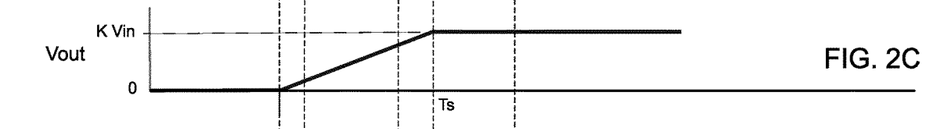
Figure 2D:
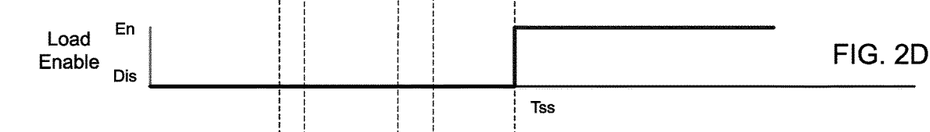
Figure 2E:
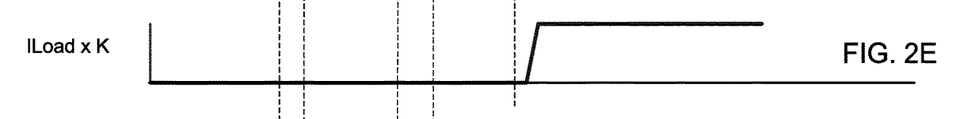

At time $T_S$, the start-up phase may end and normal or steady-state operation may commence. As shown in FIG. 2D the Load Enable signal may be generated a short time after the converter completes its start-up phase. Alternatively the Load Enable signal may be generated coincident with or even just before the converter finishes start-up, depending on the system configuration, bus converter implementation, and load behavior. As shown in FIG. 2E the load current ramps up to its normal steady state level just after the Load Enable signal. In steady-state operation the power converter output voltage, $V_O$, is maintained within its normal steady-state operating range, $V_O \approx K^* V_{IN}$, (FIG. 2C), the output current, $I_O$ varies within an expected range (not shown) and the power converter input current, $I_{IN}$, (FIG. 2B) varies accordingly within its expected range (not shown).

Figure 4:
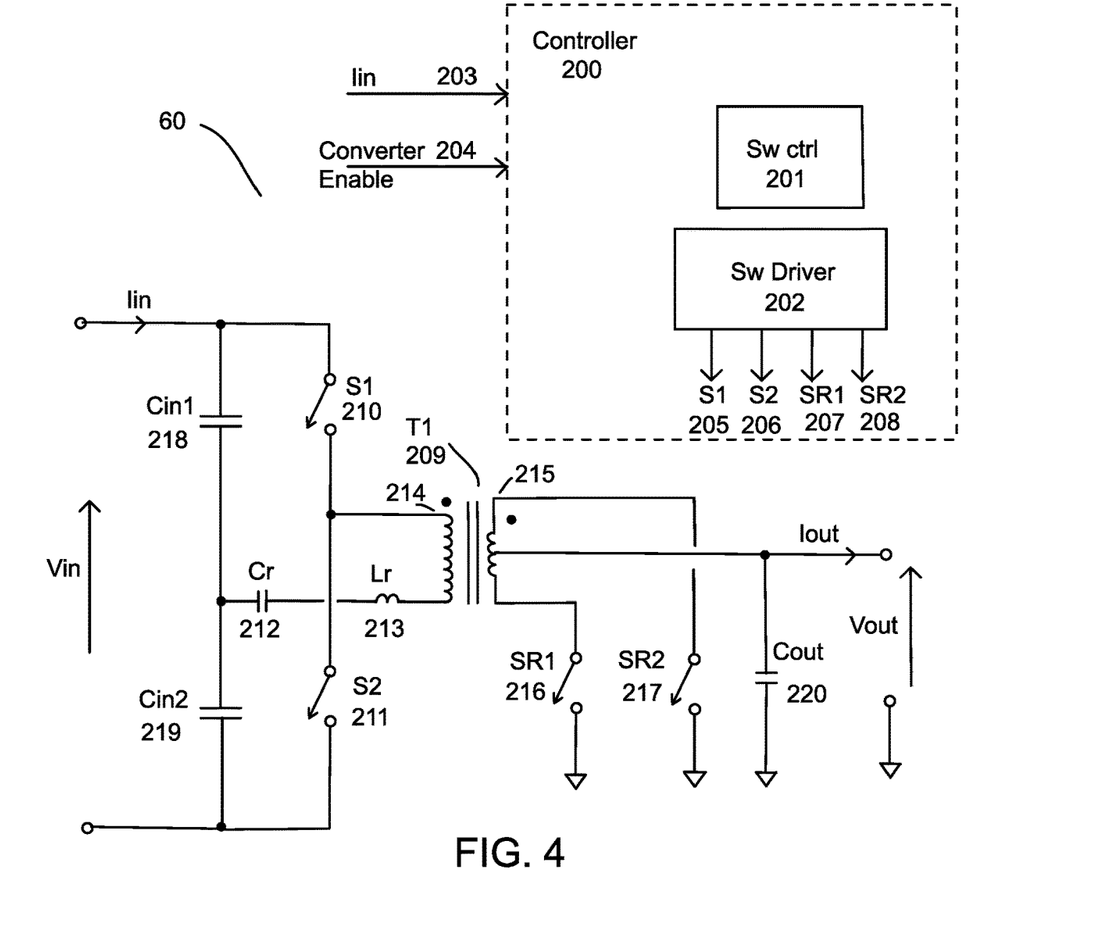
FIG. 4 shows a bus converter for use in the system of FIG. 1.

FIG. 4 shows a bus converter 60 based on the SAC topology including an ideal transformer T1 209, a resonant circuit including Cr 212 and Lr 213 connected in series with the primary winding 214 of transformer 209, primary switches S1 210, S2 211 connected to drive the transformer and resonant circuit; secondary switches SR1 216, SR2 217, connected to the secondary winding 215 as synchronous rectifiers, control circuitry 200, including switch controller 201, switch driver circuitry 202, input 204 for receiving a Converter Enable signal and input 203 for sensing input current. Detailed operation of the SAC topology is described in the SAC Patents and the basic principles of adjusting the switch drive to modulate the output resistance of the bus converter for current limiting are described in the 166 Patent, all of which are incorporated by reference.

Figure 2F:
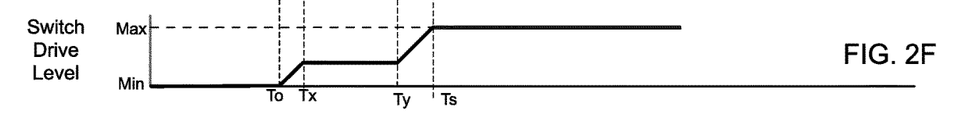
Figure 5:
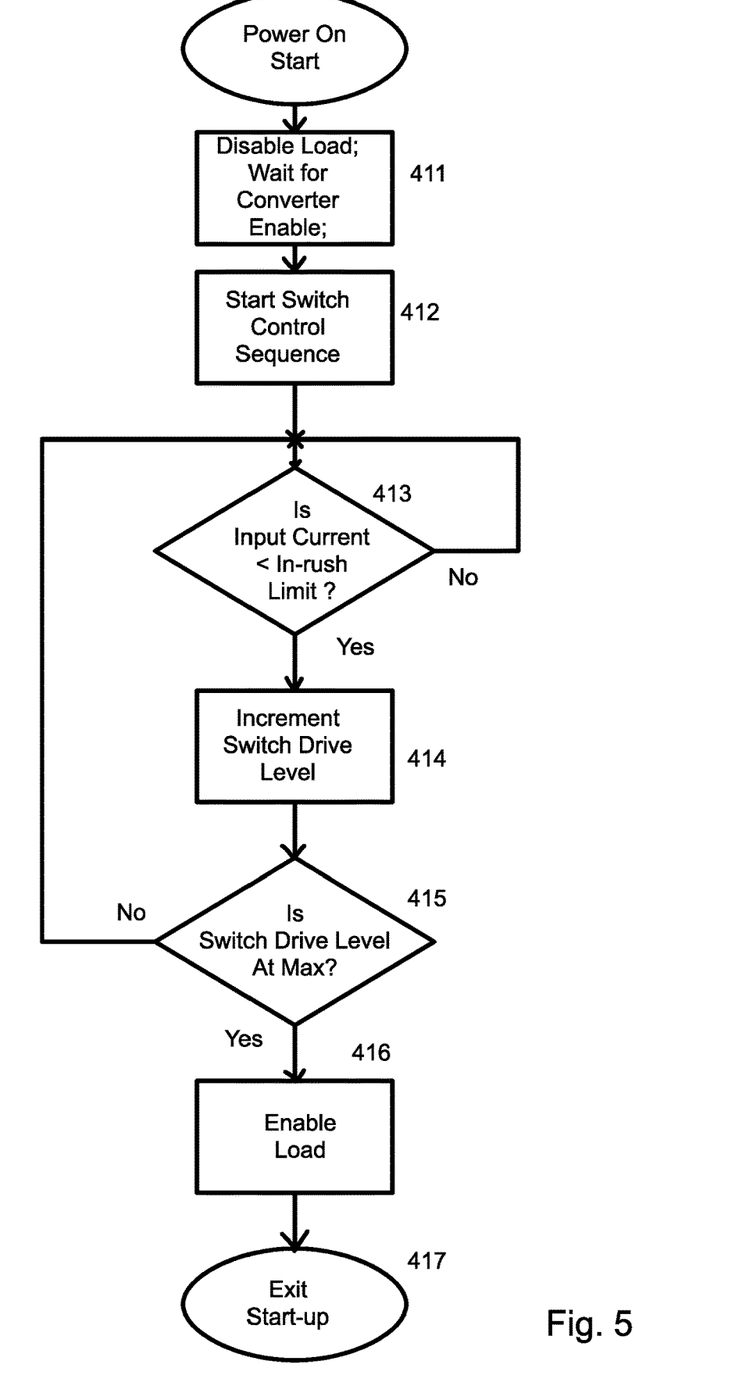
FIG. 5 shows details of a start-up phase of the system of FIG. 1.

Referring to FIG. 5, an overview of the operation of the system 10 of FIG. 1 during start-up is shown. Upon start-up, e.g. upon receiving power after an off period or following a reset), the load may be disabled by issuing or maintaining a Load Disable signal (FIG. 2D; 90a, 90b, 90c, 90d, 90e, FIG. 1) as shown in block 411, and the controller 200 (FIG. 4) in bus converter 60 may wait to receive a converter enable signal (FIG. 2A; input 204, FIG. 4). The system may issue a Convert Enable signal to the bus converter 60 at time $T_0$ (FIG. 2A), which controller 200 receives on input 204 (FIG. 4) and accordingly initiates power conversion operating cycles in the converter, i.e. issuing control signals (not shown) for turning the power switches, e.g. S1, S2, SR1, SR2, ON and OFF as shown in block 412 entitled "start switch control sequence" (FIG. 5). The switch driver 202 (FIG. 4) translates the switch control signals, e.g. logic control signals, into the appropriate switch drive signals for operating the switches, e.g. the appropriate gate drive voltages for MOSFETs, etc. The switch driver 202 gradually ramps up the switch drive level from a minimum to the full drive level, i.e. the maximum, Max, using the conceptual start-up sequence shown in blocks 413, 414, and 415 in FIG. 5. As shown, the switch driver 202 senses and compares the input current (FIG. 2B) to an inrush limit (413, FIG. 5; input 203, FIG. 4) which as shown in FIG. 2B is less than the typical maximum load current. While the input current is less than the in-rush limit, the switch drive 202 gradually increases the switch drive level (414, FIG. 5; FIG. 2F) until the full switch drive level is attained. If at any point during the ramp-up, the input current equals or exceeds the in-rush limit (the "No" condition, 413, FIG. 5), the switch driver waits for the input current to once again drop below the in-rush limit before proceeding. An example of this functionality is illustrated in FIGS. 2B and 2F, where at time $T_X$, the input current (FIG. 2B) exceeds the in-rush limit causing the switch drive level (FIG. 2F) to stop increasing. As shown from time $T_X$ to time $T_Y$, the input current (FIG. 2B) remains above the in-rush limit causing the switch drive level (FIG. 2F) to remain constant. At time $T_Y$, the input current once again drops below the in-rush threshold (FIG. 2B) and the switch drive level again starts to increase toward the full switch drive level (Max) (FIG. 2F). At time $T_S$, the switch drive level has increased to its maximum, e.g. the full drive level. As shown in FIGS. 2B and 2C respectively, the input current, $I_{IN}$, has dropped significantly, e.g. to zero or its quiescent or no-load level, and the output voltage has increased to $K^*V_{IN}$, indicating that the capacitances, e.g. 71, 72, 73, 74, 75 (FIG. 1) connected to the output of the bus converter 60 have been fully charged. As shown in function block 416 (FIG. 5) the system may enable the load using the load enable/disable signal either essentially coincident with, or shortly after, the switch drive level reaches the maximum at time $T_S$ in FIG. 2F, i.e. the "Yes" condition, in decision block 415 (FIG. 5). The load enable signal is shown issuing at time $T_{SS}$ in FIG. 2D a short time after $T_S$. The start-up sequence may end after the load is enabled as shown in block 417 (FIG. 5).

To summarize, the switch driver 202 may adjust the switch drive level based upon a comparison of the input current to desired maximum in-rush current level during start-up, thus controlling the rate at which the switch drive level rises. As the switch drive level increases, the switches may pass through a linear region of operation, for example near the threshold voltage of MOSFET switches. The ON resistance of the switches, and the equivalent output resistance of the converter, $R_O$, will thus vary smoothly from a relatively high value to a relatively low value, reducing the peak currents that would otherwise flow as the converter output filter capacitors (e.g. capacitors 71 through 75) charge to their final values ($V_O$), and the rate at which the output voltage rises to its final value, $V_O \approx K^*V_{IN}$ after the input voltage, $V_{IN}$, is applied to the power converter 60. It should be noted that the input current is essentially a function of the output current as shown and described in connection with FIG. 3 above, which provides a good measure of the output current without requiring signals to cross the isolation boundary in isolated bus converters. Furthermore, as described below in connection with FIG. 6, a measure of the input current may be derived from the voltage across the resonant capacitor Cr 212 (FIGS. 4, 6) as described in the SAC patents. After start-up in steady-state operation, the switch drive levels are maintained to minimize the ON resistance of the switches and the output resistance, $R_O$, (FIG. 3) of the converter. The bus converter 60 may conveniently generate the load enable/disable signal(s) 90a through 90e (FIG. 1, FIG. 2D) as described below in connection with FIG. 6, e.g. as the switch drive level (which may be generated internally to the bus converter) reaches its maximum. Alternatively, a supervisory controller (not shown) may control the loads with status information provided by the bus converter, or by monitoring the input current or output current of the converter, which with all loads disabled will drop to a minimal level after the capacitances are charged during start-up. As described above, the enable/disable signal may disable the active load(s) during start-up eliminating load-related contributions to the input current surge.

Figure 6:
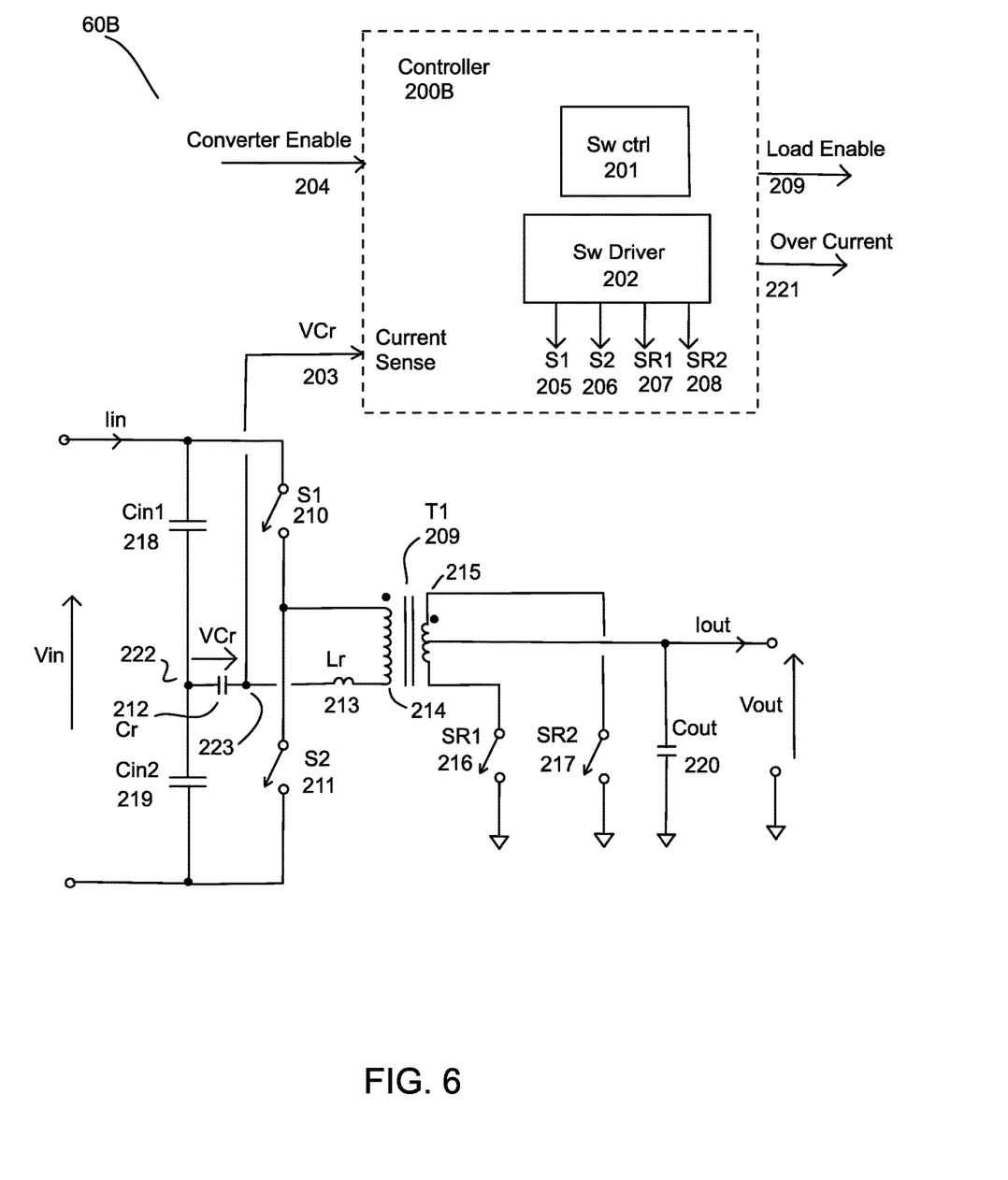
FIG. 6 shows alternate embodiment of the bus converter of FIG. 4.

Referring to FIG. 6, a modified bus converter 60B is shown with the controller 200B having input 203 connected to node 223 to sense the voltage, $V_{Cr}$, across the resonant capacitor, Cr 212; an output 209 for issuing a load enable signal; and an output 221 for issuing an over current signal. As noted above the voltage, $V_{Cr}$, across the resonant capacitor, Cr 212, may be used as a measure of the input or output current. The potential of the left end of capacitor Cr 212 connected to node 222 (between the two input capacitors, $C_{IN1}$ 218, $C_{IN2}$ 219) is essentially constant at $V_{IN}/2$, allowing the controller to conveniently sense the voltage, $V_{Cr}$, using a current sense input 203 as shown in FIG. 6 connected to node 223. The controller 200B may compare the voltage at node 223 to an internal $V_{IN}/2$ reference or alternatively use a differential input connected to sense both ends of the resonant capacitor, nodes 222 and 223. As described above, the controller 200B may issue the Load Enable signal via output 209 (416, FIG. 5) essentially coincident with, or shortly after, the switch drive level reaches the maximum (415, FIG. 5).

The current monitoring feature of the controller 200B also may be used after start-up, e.g. during steady state operation, to monitor the output current, e.g. for over-current and transient current conditions and issue one or more overcurrent signals, e.g. via output 221, e.g. indicating that the output current level, or the rate of change of the output current, has met or exceeded one or more predetermined thresholds. Such a signal may be received by one or more of the loads 81, 82, 83, 84, 85 (FIG. 1) via the respective inputs 90a, 90b, 90c, 90d, 90e (in addition to the Load Enable signals) to either reduce the instantaneous or average current drawn by the load to stay within predefined limits, compensate for an ensuing voltage perturbation in the output voltage, e.g. due to a transient current meeting or exceeding predetermined criteria, or both. In some embodiments, the controller 200B may include an input used to determine the input and/or output current and disable one or more of the loads 81, 82, 83, 84B, 85B using the control signal when the control circuit determines the input or output meets the predetermined criteria (e.g., a predetermined change in the current, a predetermined rate of change in the current, or a predetermined threshold level of the current). For example, a large semiconductor load, such as a CPU, graphics or mathematical co-processor, an ASIC, etc. or large systems, e.g. an automotive system, battery charger, etc. may have the capacity to adjust load demands, e.g. by placing some non-critical circuitry or systems in standby or reduce power operation, or make internal adjustments to accommodate a voltage transient for which adequate notice is provided. The controller 200B may issue a binary signal indicating an over-load, or load transient condition, or may include information identifying the condition and/or the relative magnitude of the condition. For example, the output 221 may sink a current proportional to the load, or use any of a number of serial communication protocols to indicate the nature and optionally the magnitude of the event. The converter 60B may further adjust the switch drive levels of the power switching elements during steady-state operation in the event of an over-current condition.

The example of FIGS. 1-6 are some of the many possible configurations in which startup current surge may be controlled by combining switch resistance modulation with active load control. The power converter 60 may comprise any of a variety of isolated and non-isolated converter topologies. For example, many known DC transformer technologies may be configured to operate with resistance modulation. Resistance modulation may be used in DC transformers having K factors less than, equal to, or greater than one. Similarly, resistance modulation for surge control may be incorporated into other known isolated and non-isolated fixed ratio converter topologies resonant and hard switched converters and switched capacitor converter topologies. Additionally, alternate methods of sensing input or output current in fixed ratio converters may be used. For example, current sensing as a function of the voltage drop across the bus converter is described in FIG. 7 of Vinciarelli, *Adaptive Control of Resonant Power Converters*, U.S. patent application Ser. No. 15/715,818, filed Sep. 26, 2017 (the "ASAC patent") assigned to VLT, Inc. and incorporated here in its entirety by reference. In some implementations, the input circuitry and at least a portion of the output circuitry are galvanically connected in series across the source for at least a portion of the converter operating cycle, such that an absolute value of the input voltage, $V_{IN}$, applied to the input circuit is approximately equal to the absolute value of the DC source voltage $V_S$ minus a number, N, times the absolute value of the output voltage, $V_{OUT}$, where N is at least 1. In some implementations, Adjusting MOSFET gate drive voltage within the linear region may provide orders of magnitude of channel resistance variation, thereby providing a wide range of variation in equivalent output resistance. Other methods may also produce smaller, but possibly useful, variations in equivalent output resistance, $R_O$, during start-up. For example, configuring a SAC controller to increase or decrease the duration of the resonant interval may produce a variation in equivalent output resistance, $R_O$, as described in Vinciarelli, *Clamped Capacitor Resonant Power Converter*, U.S. Pat. No. 9,325,247, issued on Apr. 26, 2016 (the "CSAC patent") assigned to VLT, Inc. and incorporated here in its entirety by reference; and in the ASAC patent.

Additionally, the above methods may be combined with configurable arrays of bus converters, whose system transformation ratio may be adaptively configured to perform output voltage scaling, e.g. as described in Vinciarelli, *Adaptively Configured Voltage Transformation Module Array*, U.S. Pat. No. 7,170,764, Issued Jan. 30, 2007; in Vinciarelli, *Adaptively Configured and Autoranging Voltage Transformation Module Arrays*, U.S. Pat. No. 7,212,419, Issued May 1, 2007; in *Adaptively Configured and Autoranging Voltage Transformation Module Arrays*, U.S. Pat. No. 7,420,825, Issued Sep. 2, 2008; in Vinciarelli, *Adaptively Configured and Autoranging Voltage Transformation Module Array*, U.S. Pat. No. 7,423,892, Issued Sep. 9, 2008; in *Adaptively Configured and Autoranging Power Converter Arrays*, U.S. Pat. No. 7,782,639, Issued Aug. 24, 2010, each assigned to VLT, Inc. and each incorporated herein by reference in its entirety. By connecting converter inputs in series and/or parallel and connecting converter outputs in series and/or parallel, for any given input voltage, the output voltage of an array of converters may be varied over a range. For example, if the modules in the array are DC Transformers (e.g. SACs) and the array is configured with all of the converter inputs in series and all of the converter outputs in parallel, the transformation ratio will be at a minimum and the output voltage of the array will be at a minimum value. Alternatively, if all of the converter inputs are connected in parallel and all of the converter outputs are connected in series, the transformation ratio and the output voltage of the array will be at a maximum. Other configurations of inputs and outputs will produce array output voltages that are between those minimum and maximum values. This method of configuring DC Transformers is effectively a way of modifying the overall K factor of the array. Array configuration may be used in combination with resistance modulation to effect a greater range of effective output resistance modulation and/or to improve power sharing among converters. If there is sufficient granularity in the array, and the change in output voltage caused by array reconfiguration can be made sufficiently small, array reconfiguration alone may be sufficient to control the input current surge to an acceptable level.

For the purposes of the present disclosure, values may be considered "equal," "substantially the same," "substantially equal," "essentially equal," etc. when the values are exactly equal to or nearly equal to one another.

A number of embodiments of the invention have been described. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and its practical application to enable one skilled in the art to utilize the disclosure in various embodiments and with various modifications as are suited to the particular use contemplated. Therefore, it will be understood that various modifications may be made without departing from the spirit and scope of the invention. For example, the in-rush current may be limited, e.g. during start-up, as a function power dissipation in one or more of the switching elements, e.g. by monitoring the current and voltage across one or more of the switches, or monitoring any combination of the following: input current, resonant capacitor voltage, switch voltage, voltage differential across the bus converter, etc.

Furthermore, it should be noted that although the disclosure provided herein may describe a specific order of method steps, it is understood that the order of these steps may differ from what is described, that two or more steps may be performed concurrently or with partial concurrence, and that the functions of one or more steps may implemented in circuitry. It is understood that all such variations are within the scope of the disclosure.

What is claimed is:

1. An apparatus comprising:
   a controller configured to operate one or more power switches in a series of power conversion cycles, during which power received from a power converter input at an input voltage, $V_{IN}$, and input current, $I_{IN}$, is converted for delivery to a power converter output at an output voltage, $V_{OUT}$, and an output current, $I_{OUT}$, during start-up and steady-state phases of operation using a transformation ratio, K, where $K=V_{OUT}\,V_{IN}$, that is essentially constant;
   the controller being configured to turn one or more of the power switches ON for a first duration in the start-up phase to limit the input current, $I_{IN}$, or output current, $I_{OUT}$, or both of the power converter;
   the controller being configured to turn one or more of the power switches ON for a second duration in the steady-state phase, the second duration being longer than the first duration;
   the controller being configured to disable a load during the start-up phase and selectively enable the power conversion in the start-up phase after power is applied to the converter input;
   wherein the controller is adapted to enable the load during the steady state phase.

2. The apparatus of claim 1 wherein the controller has an input for sensing a current and adjusting operation of the converter.

3. The apparatus of claim 2 wherein the controller is further adapted in the start-up phase to evaluate whether a current meets or exceeds a predetermined criteria and generate a signal in response to the evaluation.

4. The apparatus of claim 3 wherein the predetermined criteria includes a predetermined change in output current.

5. The apparatus of claim 3 wherein the predetermined criteria includes a predetermined rate of change in output current.

6. The apparatus of claim 3 wherein the predetermined criteria includes a predetermined threshold level of output current.

7. The apparatus of claim 1 wherein the controller is further adapted to sense an input voltage, $V_{IN}$, and an output voltage, $V_{OUT}$, and adjust operation of the converter.

8. The apparatus of claim 1 wherein the controller is further adapted to operate the one or more power switches to allow a current flowing in the converter to charge and discharge capacitances in the one or more power switches.

9. The apparatus of claim 1 wherein the controller is further adapted to operate the one or more power switches to allow a current through one or more of the one or more power switches to be reduced prior to turning said one or more power switches ON or OFF.

10. An apparatus for delivering power from an input source at a source voltage, $V_S$, to a load at a load voltage, $V_L$, the apparatus comprising:

a switching power converter having a converter input, a converter output, a plurality of power switching elements, a transformer, and a switch controller adapted to operate the switching power converter in a series of converter operating cycles during a start-up phase and during a steady-state phase of operation to convert power received from the converter input at an input voltage, $V_{IN}$, and input current, $I_{IN}$, via the transformer for delivery to the converter output at an output voltage, $V_{OUT}$, and an output current, $I_{OUT}$, the switching power converter using a transformation ratio, K, where $K=V_{OUT}/V_{IN}$, that is essentially constant over a range of input voltages in the steady-state phase;

the switching power converter being adapted in the steady-state phase to drive the transformer using one or more of the power switching elements in a series of standard converter operating cycles, the standard converter operating cycles having a standard period and a standard ON time;

the switching power converter being adapted in the start-up phase to drive the transformer in a series of start-up converter operating cycles, the start-up converter operating cycles having a start-up period and a start-up ON time, wherein the start-up ON period is shorter than the standard period, the start-up ON time is shorter than the standard ON time, or both;

the switching power converter being adapted in the start-up phase to limit the input current, $I_{IN}$, or output current, $I_{OUT}$, or both; and the switching power converter having an output to provide a control signal to disable the load during the start-up phase and to enable the load during the steady-state phase.

11. The apparatus of claim 10 wherein the switch controller further comprises an input for sensing the output voltage, $V_{OUT}$, and operates the switching power converter in the start-up phase when the output voltage is below a first threshold and in the steady-state phase when the output voltage is above a second threshold.

12. The apparatus of claim 10 wherein the switch controller begins operation of the bus converter in the start-up phase after the switch controller receives power and a converter enable signal.

13. The apparatus of claim 12 wherein the switch controller further comprises an input for sensing a current in the switching power converter.

14. The apparatus of claim 10 wherein a current flowing in the switching power converter charges and discharges capacitances in the switching power converter to reduce a voltage across one or more of the power switching elements prior to turn ON.

15. The apparatus of claim 14 wherein the voltage across said one or more power switching elements is reduced to essentially zero volts prior to turn ON.

16. The apparatus of claim 10 wherein the switching power converter further comprises input circuitry including one or more primary power switching elements connected to drive the transformer and output circuitry connected to receive power from the transformer; wherein the input circuitry comprises a winding having a first number of turns, the output circuitry comprises a winding having a second number of turns, and the transformation ratio is a function of a ratio of the first number of turns to the second number of turns.

17. The apparatus of claim 10 wherein the bus converter further comprises input circuitry and output circuitry, and at least a portion of the input circuitry and output circuitry are galvanically connected in series across the source for at least a portion of the converter operating cycle, such that an absolute value of the input voltage, $V_{IN}$, applied to the input circuit is approximately equal to the absolute value of the DC source voltage $V_S$ minus a number, N, times the absolute value of the output voltage, $V_{OUT}$, where N is at least 1.

18. The apparatus of claim 17 wherein the switching power converter further comprises input circuitry and output circuitry, and at least a portion of the input circuitry and output circuitry are galvanically connected in series across the source for at least a portion of the converter operating cycle, such that an absolute value of the input voltage, $V_{IN}$, applied to the input circuit is approximately equal to the absolute value of the DC source voltage $V_S$ minus a number, N, times the absolute value of the output voltage, $V_{OUT}$, where N is at least 1.

19. The apparatus of claim 10 wherein the start-up period is shorter than the standard period.

20. The apparatus of claim 10 wherein the start-up ON time is shorter than the standard ON time.

21. The apparatus of claim 10 wherein the start-up ON time is shorter than the standard ON time and the start-up period is shorter than the standard period.

* * * * *